Figure 1:
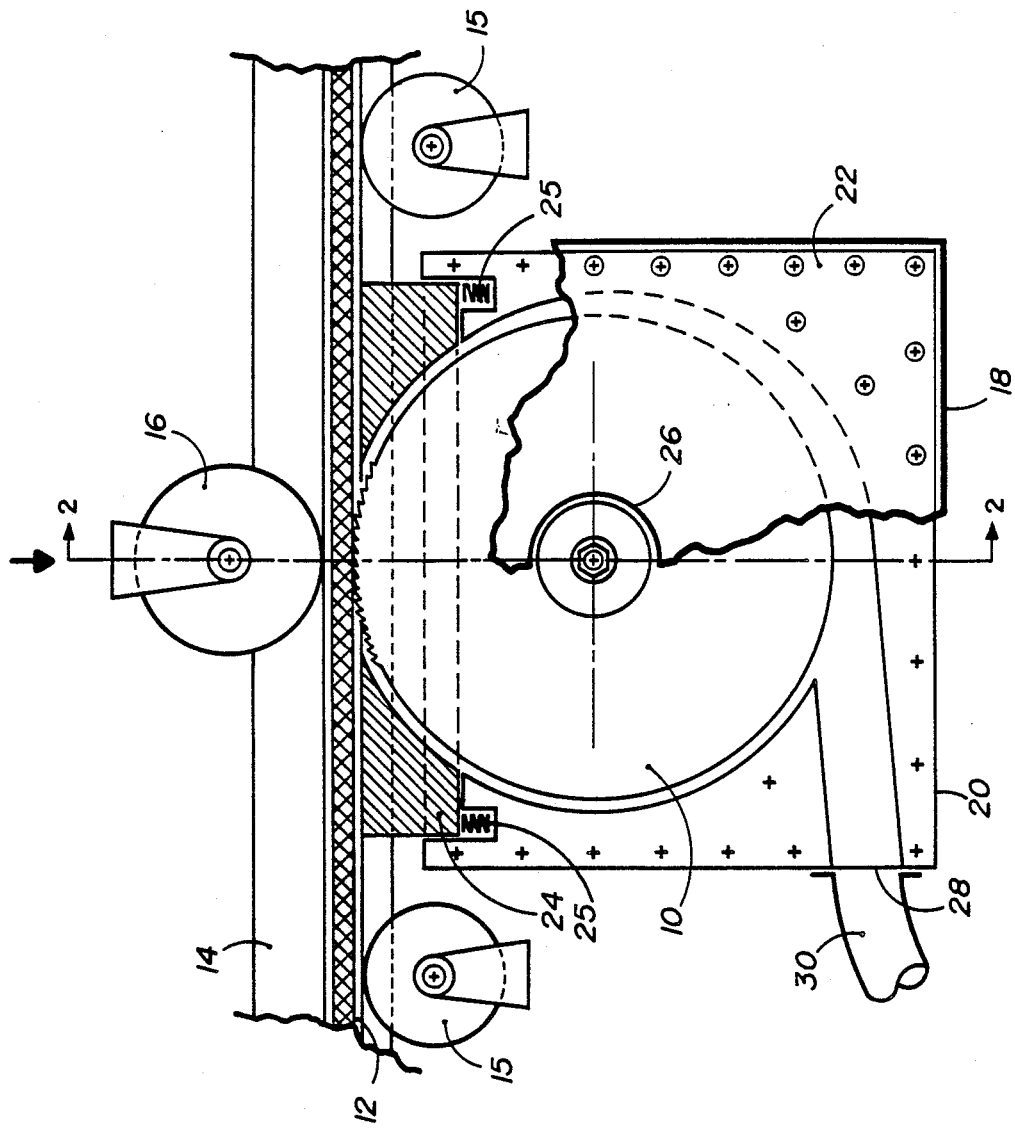

United States Patent [19]

Smyth et al.

[11] Patent Number: 4,896,572
[45] Date of Patent: Jan. 30, 1990

[54] SAW CHIP COLLECTOR

[75] Inventors: Laurence C. Smyth, Beaconsfield; Edouardo Del Rincon, Pierrefonds, both of Canada

[73] Assignee: Norandex Inc., Cleveland, Ohio

[21] Appl. No.: 271,272

[22] Filed: Nov. 15, 1988

[51] Int. Cl.⁴ .............................................. B26D 7/08
[52] U.S. Cl. ........................................ 83/100; 83/168; 83/431; 83/477.2; 83/478
[58] Field of Search ................... 83/98, 100, 168, 169, 83/477.2, 478, 422, 431, 436; 144/252 R; 51/273

[56]  References Cited
U.S. PATENT DOCUMENTS

| | | | |
|---|---|---|---|
| 1,769,927 | 7/1930 | Langill et al. | 83/431 |
| 3,831,473 | 8/1974 | Fleissner | 83/100 |
| 4,063,478 | 12/1977 | Stuy | 83/100 |
| 4,200,417 | 4/1980 | Hager et al. | 83/100 X |
| 4,230,005 | 10/1980 | Varga | 83/100 |
| 4,241,505 | 12/1980 | Bodycomb, Jr. et al. | 83/100 X |
| 4,255,995 | 3/1981 | Connor | 83/100 |
| 4,403,534 | 9/1983 | Altendorf et al. | 83/100 |
| 4,721,023 | 1/1988 | Bartlett et al. | 83/100 |

Primary Examiner—Frank T. Yost
Assistant Examiner—Eugenia A. Jones
Attorney, Agent, or Firm—Fleit, Jacobson, Cohn, Price, Holman & Stern

[57] ABSTRACT

A saw chip collector for use in cutting slots in a work, comprises an enclosure surrounding the saw blade except for an opening at the cutting position, a floating block mounted on the enclosure at the blade cutting position and spring biased against the work for sealing the top of the enclosure against the bottom of the work, an opening in the enclosure at the hub of the saw blade for drawing air into the enclosure, and an output port in the enclosure for flushing out the sawn chips.

7 Claims, 1 Drawing Sheet

SAW CHIP COLLECTOR

This invention relates to a saw chip collector for use in cutting slots into a work, and more particularly to a saw chip collector for use in debridging of aluminum thermal barrier profiles.

Various bonnets, hoods and enclosures have been utilized in conjunction with power saws for collecting chips produced during operation. For the most part, these devices partly enclose the power saw and the chips are induced to enter a discharge port in the enclosure for removal via a hose, there being a vacuum cleaner or other source of vacuum attached to the opposite or remote end of the hose. The difficulty with prior art devices, generally speaking, is that the enclosure cannot completely enclose the circular saw blade and thus a considerable amount of chips can escape into the surrounding environment.

It is the object of the present invention to provide a saw chip collector which ensures a minimum escape of the sawn chips into the surrounding environment when cutting slots into a work, more particularly when cutting slots into a composite aluminum-plastic profile. In the later application, it is particularly important to prevent flying of metal particles around the work area and also to reduce the noise which is inherently higher than in other applications such as wood cutting. It is also important to collect as much of the sawn metal particles as possible since they may be recycled.

The saw chip collector, in accordance with the present invention, comprises an enclosure surrounding the saw blade except for an opening at the cutting position, and a floating block mounted on the enclosure at the blade cutting position and spring biased against the work for sealing the top of the enclosure against the bottom of the work. The enclosure has an opening at the hub of the saw blade for drawing air into the enclosure. An output port is also provided in the enclosure for flushing out the sawn chips.

The enclosure is preferably made of an enclosure body having a cavity for housing the saw blade which has a width about twice the width of the blade, and a cover plate secured to the enclosure body and having the hub opening at the centre thereof. A radial clearance is provided in the cavity of the first plate and is shaped as an increasing spiral channel to direct the sawn chips circumferentially out of the enclosure through an output port which may be connected to a vacuum system to convey the chips to a remote storage device.

The width of the enclosure can be kept to about 4 times the width of the blade and the width of the floating block can be kept at about 1.5 times the width of the blade. In applications such as debridging of aluminum thermal barrier profiles, this allows cutting profiles with close spaced fin like projections while fully practising the intent of the invention.

Figure 2:
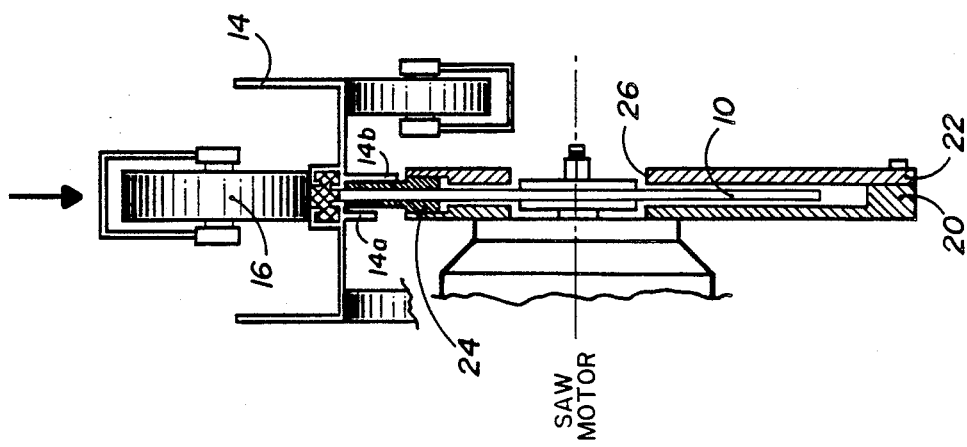

The invention will now be disclosed, by way of example, with reference to an embodiment illustrated in the accompanying drawings in which:

FIG. 1 is a section view through the saw chip collector in accordance with the present invention; and FIG. 2 is a section view through the saw chip collector of FIG. 1.

Referring to the drawings, there is shown a saw chip collection system used in the debridging line of an aluminum window profile thermalization process. In such a debridging operation, a saw blade 10 cuts a longitudinal slot 12 through an aluminum profile 14 as it is moved through the saw blade by support and conveying rolls 15 under the pressure of a hold down roll 16. The blade 10 is totally enclosed by a tight fitting enclosure 18 except for an opening at the cutting position. The enclosure is made of a main enclosure body 20 which is secured to the saw blade motor and has a cavity for housing the saw blade, and of a cover plate 22. A floating block 24 sits in a cavity formed between enclosure body 20 and cover plate 22 and rubs on the aluminum profile under the pressure of suspension springs 25, thus creating a seal which ensures that the as-sawn chips are directed circumferentially in a predetermined clearance formed between the blade and the enclosure. The width of the enclosure is about 4 times the width of the blade but the width of the floating block is about 1.5 times the width of the blade to allow cutting profiles with close spaced fin like projections such as projections 14a and 14b in FIG. 2 of the drawings. A hub opening 26 in the cover plate 20 of the enclosure allows the rotating saw blade to pull in air and throw it out radially to assist flushing of the sawn chips. The radial clearance between the blade and the enclosure is shaped as an increasing spiral channel to direct the sawn aluminum chips out of the enclosure at output port 28 and prevent them from going back into the cutting zone. A vacuum system 30, although not essential can be used to convey away the sawn chips to a collection silo. Also, because the cutting zone is almost totally enclosed and can be partially evacuated, and because the enclosure contacts the aluminum profile to dampen vibration, the chip collection system works effectively as a noise enclosure.

The saw chip collector in accordance with the present invention uses the centrifugal action of the blade to throw the aluminum chips against the smoothly shaped clearance in the enclosure and the momentum of the chips help direct them around the basically rectangular sectioned increasing spiral channel. The size of the clearance is kept to a minimum to maximize the chip velocity. The centrifugal action of the blade is also used to draw in air at the hub and blow it out the spiral channel thereby flushing the saw teeth and assisting in the chip removal. The enclosure is connected to a vacuum system merely to convey the collected chips to a chip storage device.

Although the invention has been disclosed with reference to a preferred embodiment, it is to be understood that it is not limited to such embodiment and that other alternatives are also envisaged within the scope of the following claims.

We claim:

1. A saw chip collector for use in cutting slots in a work, comprising:
   (a) an enclosure surrounding a saw blade except for an opening at a position in which the blade cuts the work, said enclosure having a cavity for housing the saw blade which has a width about twice the width of the blade;
   (b) a floating block mounted on the enclosure at the blade cutting position and spring biased against the work for sealing the top of the enclosure against the bottom of the work;
   (c) an opening in the enclosure at the hub of the saw blade for drawing air into the enclosure;
   (d) an output port in the enclosure for flushing out the sawn chips; and
   (e) a radial clearance provided in the cavity of the enclosure which is shaped as an increasing spiral channel to direct the sawn chips circumferentially out of the enclosure through said output under centrifugal action of the blade.

2. A saw chip collector as defined in claim 1, wherein the enclosure is made of an enclosure body and a cover plate secured to the enclosure body, said cover plate having the hub opening at the centre thereof.

3. A saw chip collector as defined in claim 1, further comprising drive means for conveying the work through the saw and means for holding down the work against the floating block to help in sealing the floating block of the enclosure against the bottom of the work.

4. A saw chip collector as defined in claim 1, wherein the saw is used for debridging aluminum thermal barrier profiles.

5. A saw chip collector as defined in claim 1, wherein the floating block of the enclosure dampens vibration and reduces noise.

6. A saw chip collector as defined in claim 1, wherein the width of the enclosure is about 4 times the width of the blade and the width of the floating block is about 1.5 times the width of the blade.

7. A saw chip collector as defined in claim 1, further their comprising means for connecting a vacuum system to said output port to convey the sawn chips to a collection silo.

* * * * *